Nov. 18, 1941.  C. ADLER, JR  2,263,449
AIRPLANE
Filed Nov. 25, 1940
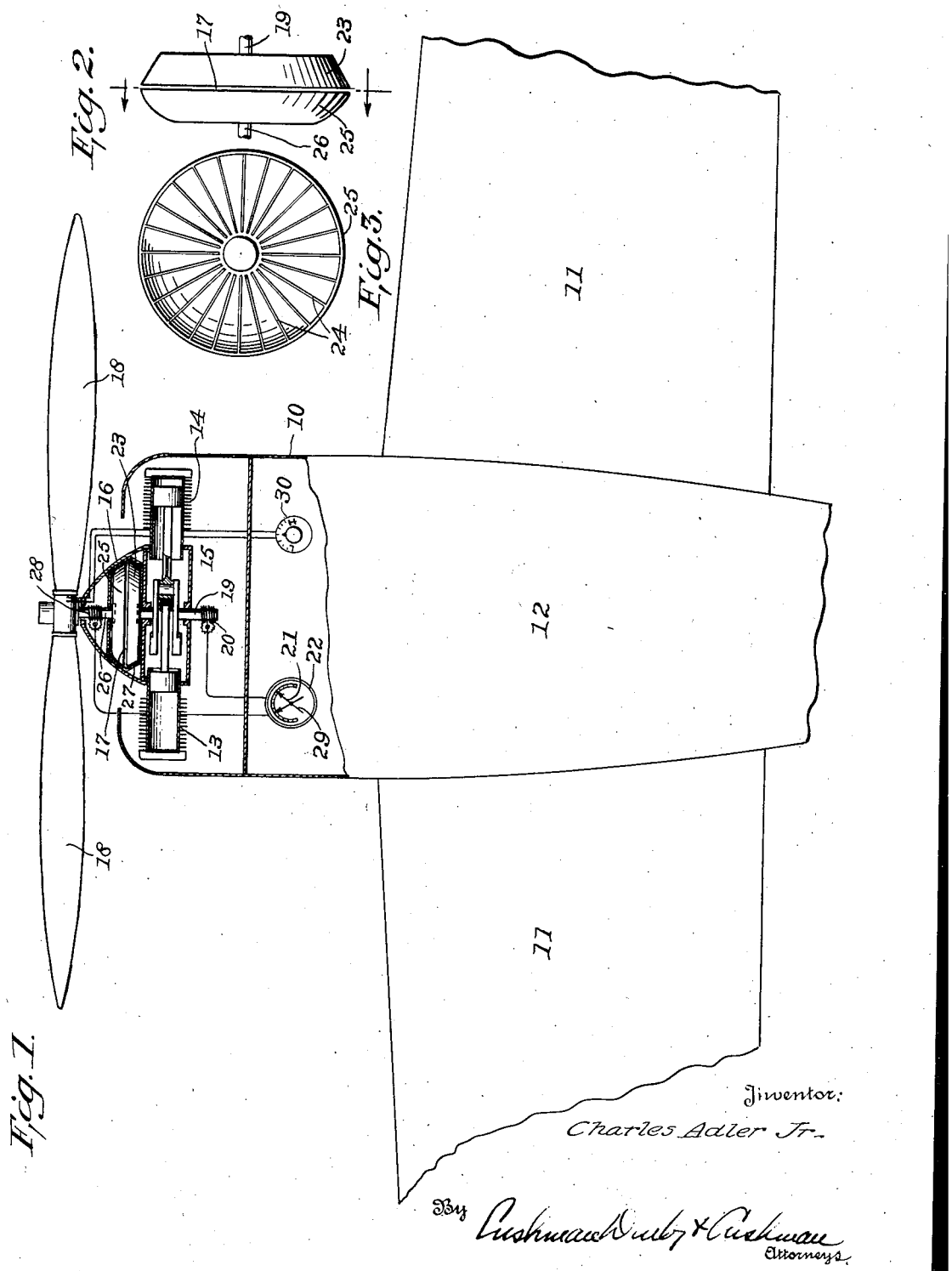
Inventor:
Charles Adler Jr.
By Cushman Darby & Cushman
Attorneys Patented Nov. 18, 1941

2,263,449

UNITED STATES PATENT OFFICE 2,263,449

AIRPLANE

Charles Adler, Jr., Baltimore, Md.

Application November 25, 1940, Serial No. 367,137

1 Claim. (Cl. 244—53)

My invention relates to airplanes and is particularly concerned with improving the control and reliability of performance of aircraft and with increasing the life of the plane structure.

The invention comprises an airplane having a prime mover with which is associated a suitable fluid coupling preferably of the liquid impeller and runner type driving a variable pitch propeller.

By reason of such construction, it is possible, in contra-distinction to direct mechanical drive mechanisms, to accelerate the speed of the engine to a desired optimum R. P. M. with increased rapidity and maintain this optimum R. P. M. under such adverse circumstances as when the plane is taking off and climbing. This is desirable in affording better control of the plane as, for instance, allowing a quicker take-off. Moreover, the effect of the climbing resistance factor is so materially reduced by the use of the variable pitch propeller in combination with the fluid coupling that the motor operates at substantially its maximum efficiency and with but little loss of power at the propeller throughout the climb.

Furthermore, the construction embodying a prime mover, a fluid coupling and a variable pitch propeller improves the safety and reliability of the plane. That is to say, aircraft engineers have been constantly seeking to reduce vibration and the mechanical failures which have frequently been the result of such forces in conventional aircraft. With the present invention, strains and stresses created by the motor and its shaft and by the propeller and its shaft are effectively absorbed or cushioned by the fluid coupling. Consequently, my invention affords a marked improvement in smoothness of operation and substantially eliminates dangerous vibrational forces. It follows, that not only is the reliability of performance substantially enhanced, but wear upon the plane structure is materially reduced, thus greatly increasing the operating life of the aircraft. In addition, the present invention adds materially to the riding comfort of passengers which has become an important factor in air transportation.

Another advantage of the present invention which is of the highest importance is to be found in cases of the engine failing, for instance due to low idling speed, where it is some times impossible to re-start the engine by diving the ship when the propeller is connected rigidly to the engine. This is due (1) to the propeller being stationary, in which condition the wind cannot overcome the inertia of the engine parts and the resistance of the compression, and (2) if the propeller is turning, it might not be possible to cause the engine to fire because the propeller cannot be turned at great enough speed by the wind. With the present invention, however, if the engine fails, the pilot can instantly change the pitch to high pitch, and upon diving the ship, the propeller will immediately revolve rapidly, due to resiliency of the fluid in the coupling, and the engine will be gradually brought up to speed. After the propeller has begun revolving at a fair speed by the wind, this speed may be increased by the pilot changing the pitch of the propeller, and the engine turned over accordingly. Thus, by means of the combination of the fluid coupling and the variable pitch propeller, initial inertia is readily overcome.

I have found that a fluid coupling of the liquid impeller and runner type is particularly desirable for aircraft, since its use does not entail any substantial increase in weight or "drag." The employment of this efficient transmission for aircraft propulsion, however, involves numerous difficulties such as the problem of overcoming slippage and resultant loss of power particularly encountered when the plane is climbing. Mechanical expedients are not feasible to reduce these objections in aircraft for many reasons among which may be mentioned the added weight involved, and the possibility of failure of the parts of the mechanism. I have discovered that the aforementioned advantageous results are obtained, and the problems just recited are effectively solved by utilizing a variable pitch propeller with a coupling of the liquid impeller and runner type. Such construction eliminates the objectionable fluid coupling slippage while permitting the engine to operate at its maximum R. P. M. and affords substantially unlimited intermediate control or variation of the propeller speed to decrease the R. P. M. differential between the motor and propeller. While slippage permits the engine to operate at higher and more efficient speed, any substantial slippage, for instance, during climbing would cause a loss of power at the propeller were it not for the use of a variable pitch propeller. By using a variable pitch propeller and varying the pitch in accordance with the R. P. M. differential between the engine and propeller, the power which would be lost at the propeller due to slippage is substantially reduced. Thus, as the tendency towards slippage increases, the blade angle is made to decrease and vice versa so that the flexibility of control is in marked distinction to a fluid coupling with mechanical transmission and constant pitch propeller, i. e., variable gear reduction which is limited to control at a few definite stages. Variable pitch propellers have now been developed to a high state of efficiency and the fluid coupling is carried in a sealed housing substantially continuous with the crank case of the motor and suitably streamlined.

For purposes of illustration, I have shown and will describe the invention in association with an airplane using a single radial internal combustion engine of conventional type. It is to be understood, however, that other types of engines, both of the water-cooled and air-cooled types as well as Diesel engines and steam engines may be employed and that a multiplicity of such prime movers may be used.

Referring to the drawing:

Figure 1 is a plan view illustrating the invention applied to a conventional type of airplane using a single motor which is mounted on the fuselage and manually adjustable means for varying the pitch of the propeller; where multiple motors are employed, the same may be mounted on the wings or upon the fuselage or both in the usual manner;

Figure 2 is a detail plan view of an impeller-runner type of fluid coupling; and Figure 3 is an interior elevation of the impeller member shown in Figure 2.

In the drawings, I have shown the airplane as a whole at 10 comprising wings 11 and a fuselage 12. The prime mover or motor is indicated at 13 and in the case of a single motor is mounted in the usual manner on the front of the fuselage as shown at 14. Extending forwardly of and substantially in continuation of the crank case 15 of the radial motor is a sealed coupling housing 16 which contains the fluid coupling 17 by which the variable pitch propeller 18 is driven from the motor.

The diameter of the coupling housing 16 is not greater than the diameter of the crank case with which it is sealed. If it be necessary in the interest of power to provide a larger coupling, the coupling is modified longitudinally rather than radially so that at no time will the coupling housing increase drag beyond that usually entailed by the presence of the crank case. In this connection, it will be noted that the housing 16 not only forms a sealed continuation of the crank case of the engine, but is also suitably streamlined so as to decrease resistance to the air and slip stream.

The drive shaft of the motor is indicated at 19, and at its rear end has a tachometer connection 20 leading to a tachometer needle 21 mounted upon the visible instrument 22. At its other end, the motor drive shaft 19 is connected to the impeller 23 of a liquid impeller and runner type of coupling 17. This impeller is preferably of cup-shape form as shown in Figure 2 and is provided interiorly with a multiplicity of vanes 24. The impeller generally resembles a grapefruit half-section from which the meat has been scooped out, leaving a multiplicity of divisions which constitute the vanes 24. The runner 25 of the coupling which cooperates with the impeller is of substantially similar shape and construction as the impeller and is carried by the driven shaft 26 upon which the propeller 18 is mounted. The casing 27 for the coupling elements 23 and 25 is sealed and contains therein a fluid which is preferably a light oil well known for the purpose. The impeller and runner are closely spaced together within the casing and this adjustment may be either fixed, or variable, in order to promote the greatest efficiency. Preferably, the spacing is fixed, but means (not shown) may be provided for changing this spacing as required. It is to be understood, of course, that there is no mechanical connection between the impeller and runner. The latter is rotated to impart rotation to the propeller solely by means of the fluid connection provided by the presence of the oil within the casing 27 and the rotation of the impeller by the motor.

The driven shaft 25 has a suitable tachometer connection 28 similar to the connection 20 and leading to the needle 29 of the visible instrument 22.

The propeller 18 is of the well known variable pitch type and I provide suitable means 30 as shown in Figure 1, for example, hydraulic means to manually control the pitch of the propeller in accordance with the tachometer readings. That is to say, the pitch of the propeller blades is adjusted to decrease the differential in R. P. M. of the shafts 19 and 26 so as to assure that the loss of power due to slippage between the impeller and the runner of the fluid coupling, as, for example, when the plane is climbing, is reduced to a minimum because of reduced slippage. Thus, when the plane is climbing, the pilot upon observing the tachometer readings operates the instrument 30 to decrease the blade angle and counteracts slippage.

In the operation of the plane when taking off and climbing, full-throttle is used and the engine is operated at far greater R. P. M. than when cruising in level flight. But if the blades of the propeller were fixed and not adjustable, the propeller would not turn as fast as the engine and loss of power would result. This condition would be caused by slippage in the fluid coupling due to climbing resistance. However, by using a propeller whose pitch can be adjusted, the blades can be placed in the low angle position which will reduce the slippage in the fluid coupling and cause the propeller to operate much more efficiently and to revolve at higher speed. By means of the two needles of the tachometer, the pilot can observe the relative speeds of propeller and engine and vary the pitch of the propeller blades so as to bring the needles as close together as possible.

When the plane reaches a position of level flight, it is only necessary for the pilot to increase the pitch of the propeller blade, i. e., the blade angle and adjust the throttle to normal cruising speed.

It will be appreciated from the foregoing description that by reason of the novel construction provided, the R. P. M. differential between the motor and the propeller is maintained at a minimum and is substantially constant both during climbing and level flight. The construction assures that slippage will be overcome at the coupling and that loss of power at the propeller will at all times be reduced to a minimum. Under all conditions, the propeller revolves at the optimum R. P. M. for each particular flight condition, i. e., in response to the power transmitted to the propeller shaft with the blades of the propeller at their properly adjusted angle.

The fluid coupling may, if desired, be provided with automatically or manually operable means whereby should a leak develop in the housing 27, the coupling members will be brought into contact and furnish a direct mechanical drive.

I claim:

An airplane including wings and a body, a prime mover including a shaft, a variable pitch propeller including a shaft, an impositive fluid coupling connecting and driving the propeller from said prime mover, means operatively associated with both said shafts for indicating the relation between the prime mover speed and the propeller speed, and means for varying the pitch of the propeller whereby to reduce loss of power at the propeller during varying conditions of flight.

CHARLES ADLER, JR.